(No Model.)
J. BUTTON.
CAR COUPLING.
No. 330,820. Patented Nov. 17, 1885.
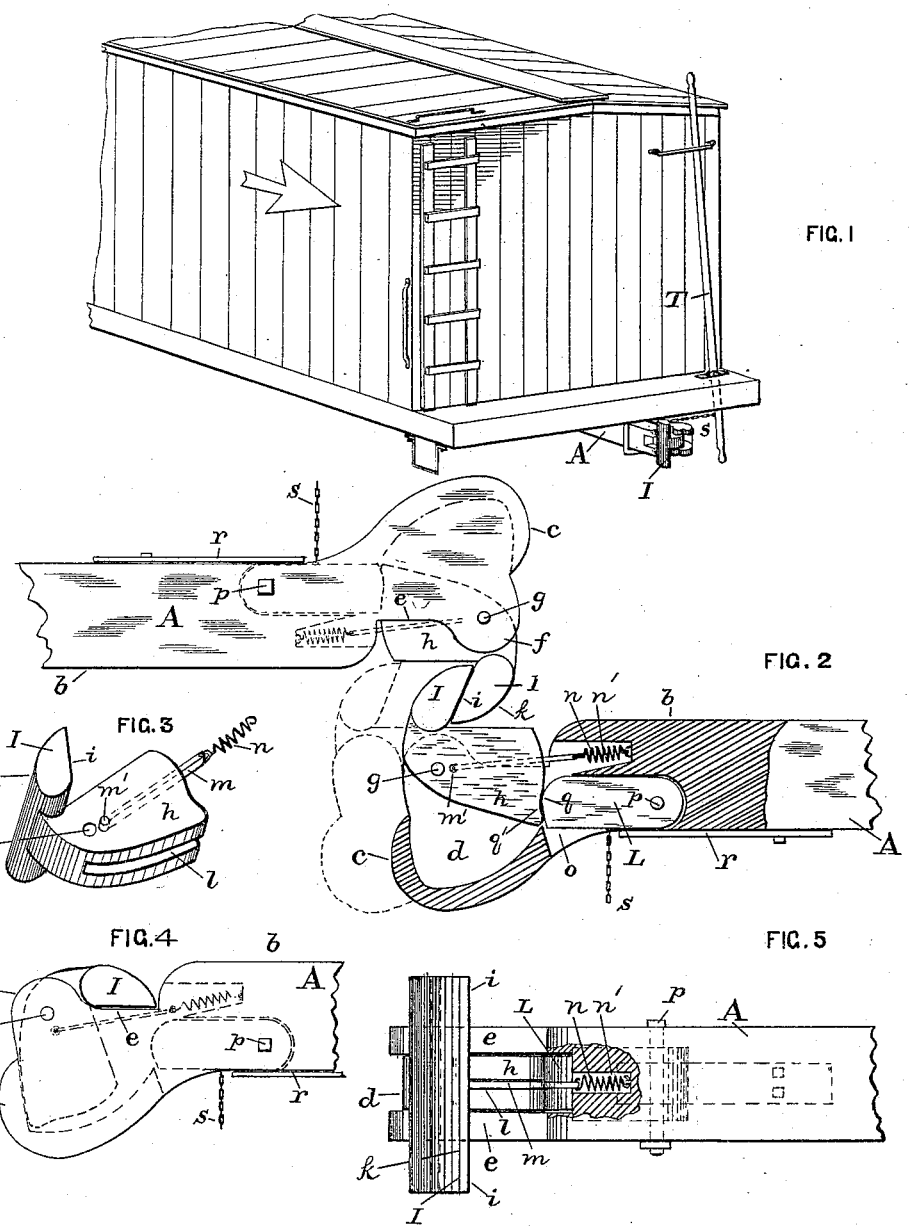
WITNESSES
G. B. Thomas
John E. Morris.
INVENTOR
Joseph Button
By Chas B. Mann
Attorney

UNITED STATES PATENT OFFICE.

JOSEPH BUTTON, OF BALTIMORE, MARYLAND, ASSIGNOR OF ONE-HALF TO WERNER WINDUS, OF SAME PLACE.

CAR-COUPLING.

SPECIFICATION forming part of Letters Patent No. 330,820, dated November 17, 1885.

Application filed September 22, 1885. Serial No. 177,786. (No model.)

*To all whom it may concern:*

Be it known that I, JOSEPH BUTTON, a citizen of the United States, residing at Baltimore, in the State of Maryland, have invented certain new and useful Improvements in Car-Couplings, of which the following is a specification.

My invention relates to certain improvements in car-couplings of the pivoted-hook class—that style of pivoted hook that moves laterally, or in a horizontal plane. The improvement will be described in connection with the drawings, and the invention will then be designated in the claims.

Referring to the annexed drawings, which illustrate the invention, Figure 1 is a view of a car to which the improved coupler is applied. Fig. 2 is a top view, in which two draw-heads or couplers are shown connected, one being shown in horizontal section. Fig. 3 is a view separately of one of the pivoted hooks. Fig. 4 is a view of one draw-head, showing the position taken by both pivoted hooks at time of coupling—that is, while one draw-head is passing the other. Fig. 5 is a vertical side view of one draw-head.

The letter A designates the shank of the draw-head, which is to be attached to the car in any usual or convenient manner. It should be attached a little to one side of the car-center, so that one of its sides, *b*, will be nearly on the said center line. The front or buffing part *c* of the draw-head is rounded in front, and said part projects obliquely to the left side from the shank part A. This buffing part is hollowed or recessed, as at *d*, and at the right side the recess is open to allow the shank part of the pivoted hook to move in it, and the upper and lower parallel edges, *e*, comprise that part of the draw-head which incloses or forms the top and bottom of the hook-shank recess. That side of the draw-head whereat the upper and lower edges, *e*, are located is parallel with the side *b* of the shank, and this part is cut away inward, whereby said edges *e* are on a different plane from the side *b* of the shank. This leaves at the right side and front a rounded lateral protuberance, *f*, above and below the hook-shank recess *d*, and the pivot-pin *g* of the pivoted hook I passes down through these two rounded protuberances. The pivoted hook I in the vertical direction is long enough to extend both above and below the draw-head or draw-bar. (See Figs. 1 and 5.) This feature provides for variations in the height of cars, so that although the draw-heads of two cars which are to be coupled may greatly vary in height, they will, if thus constructed, readily couple. The hook has a shank, *h*, provided with a hole, *g'*, for the pivot-pin *g*. The drawing-face *i* of this hook is flat, and when two of these hooks are coupled the said flat faces are in contact, as in Fig. 2. The back *k* of each hook is rounded to facilitate one draw-head passing the other at time of coupling. At such time the hook will yield and turn on its pivot, and the flat face *i* of each hook will take position against the edges *e* at the right side of the recess in the draw-head, as shown in Fig. 4. It will be seen that as this side of the draw-head where the edges *e* are, is cut away inwardly, as already stated, the hook, when taking the position shown in Fig. 4, will not have its back *k* beyond the line of the side *b* of the shank. The broken lines in front of one of the draw-heads in Fig. 2 is to indicate the play or endwise movement the draw-heads may have when two are coupled together. The construction which permits this prevents a train of cars from being too rigid or solid. The shank *h* of the pivoted draw-hook has a slot, *l*, (see Figs. 3 and 5,) which divides it horizontally. A link-bar, *m*, occupies this slot, and one end is pivoted in the shank at *m'*, near the pivot-hole *g'*, and to the other end a spiral spring, *n*, is attached, and said spiral spring occupies a recess, *n'*, formed in the draw-head, or in the shank of the draw-bar, where it is made fast. This construction of pivoted hook I, shank, link-bar, and spiral spring serves to hold the hook normally to the position it occupies when it is coupled, and at the same time permits the said hook and its shank to turn horizontally in two directions— that is to say, the hook may turn to the position shown in Fig. 4, as when coupling, or it may turn in the opposite direction, as when uncoupling. A stop, L, occupies a recess, *o*, in the left side of the draw-head shank, and one end of the stop is pivoted at p, whereby the stop may turn laterally. The free end or front end, q, of this pivoted stop is slightly rounded, (see Fig. 2,) and the said rounded end fits snugly against a slight concavity, q', in the rear end of the hook-shank h, and thereby locks or retains the hook in the coupled position. When two draw-heads are coupled together, these pivoted stops retain or hold the hooks firmly to their position and prevent uncoupling. A leaf-spring, r, is secured by one end to the side of the draw-bar shank, and its free end bears against the pivoted stop L and serves to press it into the recess o, and thereby keep its end engaged with the hook-shank h. A chain, s, is made fast to the pivoted stop L of each draw-head, and is attached to an upright lever, T, pivoted at the end of the car. The upper end of this lever projects above the car-roof, and thereby it may be moved by a person on the car. The lower end projects below the car-body. By grasping this lever at either its upper or lower end the pivoted stop L may be drawn out, and thus the draw-hook be released and allowed to turn, so as to uncouple from the other draw-hook.

As already described, it will be seen the device couples automatically — that is, the coupling is effected by bringing one draw-head against the other. If desired, the hooks I may have a horizontal slot at the center— i.e., midway between the top and bottom—for an ordinary coupling-link, and a vertical hole for an ordinary coupling-pin, and thereby they would couple with cars having the link-and-pin coupling.

Having described my invention, I claim and desire to secure by Letters Patent of the United States—

1. In a car-coupling, the combination of a draw-head having a recess, d, open at one side in a horizontal direction, a coupling-hook, I, having a shank, h, pivoted in the open-sided recess to turn in a horizontal plane, a recess, n', in the shank of the draw-head, a spring, n, occupying the last-named recess, and a link-bar having one end pivoted to the coupling-hook shank and its other end connected to the said spring, as set forth.

2. In a car-coupling, the combination of a draw-head having a recess, d, open at one side in a horizontal direction, a coupling-hook, I, having a shank, h, pivoted in the recess to turn in a horizontal plane, and provided with a horizontal slot, l, a link-bar occupying the shank-slot and pivoted therein, and a spring, n, connecting the link-bar with the draw-head, as set forth.

3. In a car-coupling, the combination of a draw-head having a recess, d, open at one side in a horizontal direction, a coupling-hook, I, having a shank, h, pivoted in the recess to turn in a horizontal plane, a recess, o, in the draw-head shank, open at the side opposite that where the coupling-hook is pivoted, a stop, L, pivoted by one end in the last-mentioned recess to turn laterally, a leaf-spring, r, on the side of the draw-head shank and bearing against the pivoted stop, a lever, T, pivoted at the end of the car, and a chain, s, connecting the pivoted stop and the said lever, as set forth.

In testimony whereof I affix my signature in presence of two witnesses.

JOSEPH BUTTON.

Witnesses:
  JNO. T. MADDOX,
  JOHN E. MORRIS.